Figures 1, 2:
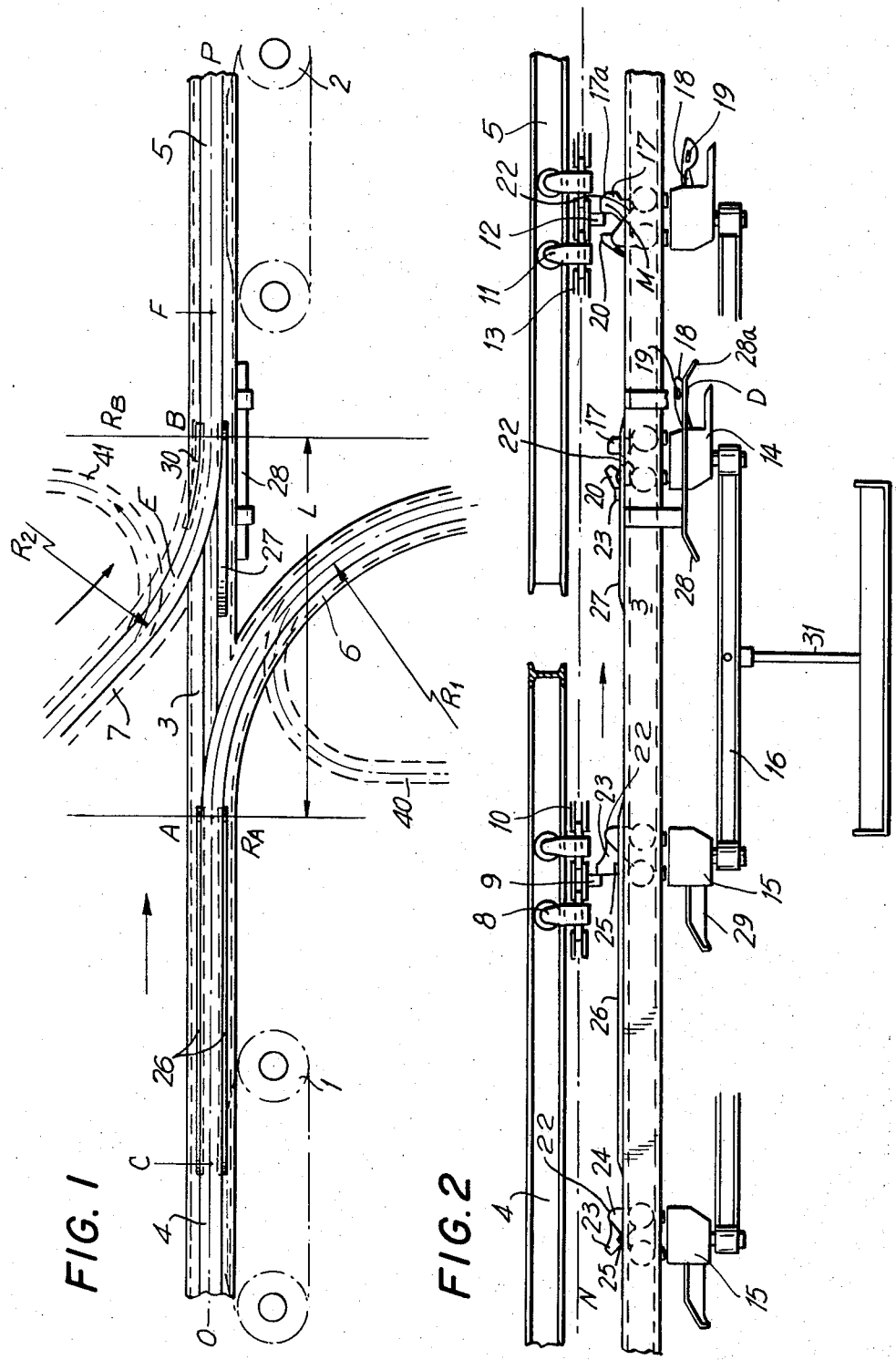

United States Patent
Kling

[11] 3,812,787
[45] May 28, 1974

[54] CONVEYOR COMPRISING A PLURALITY OF DRIVE MEANS FOR SUCCESSIVELY DRIVING A LOAD CARRIER

[75] Inventor: Georg Kling, Bonn, Germany

[73] Assignee: Pohlig-Heckel-Bleichert Vereinigte Maschinen-fabriken Aktiengesellschaft, Cologne, Germany

[22] Filed: Nov. 1, 1971

[21] Appl. No.: 194,321

[30] Foreign Application Priority Data
Oct. 31, 1970   Germany............................ 2053658

[52] U.S. Cl................................. 104/96, 104/172 S
[51] Int. Cl............................................... B61j 3/04
[58] Field of Search............................ 104/172 S, 96

[56] References Cited
UNITED STATES PATENTS
3,451,352   6/1969   Curry et al...................... 104/172 S Primary Examiner—Robert J. Spar
Assistant Examiner—Lawrence J. Oresky
Attorney, Agent, or Firm—Waters, Roditi, Schwartz & Nissen

[57] ABSTRACT

Conveyor comprising a plurality of drive means for driving a load carrier in a successive manner. The load carrier is carried by wheels movably supported on at least one track rail and adapted to be coupled to a drive chain which is guided by a drive rail and provided with coupling elements. The load carrier includes a main stop movable into and out of the path of a coupling element, and a locking pawl, with the main stop extending therebetween. First and second camming bars of predetermined lengths are positioned respectively above and below the track rail at distances to each other with at least a portion of the second camming bar extending into a transfer section so as to maintain the main stop in predetermined inoperative relationship until the main stop has been conveyed beyond that transfer section.

16 Claims, 2 Drawing Figures

CONVEYOR COMPRISING A PLURALITY OF DRIVE MEANS FOR SUCCESSIVELY DRIVING A LOAD CARRIER

This invention relates to an arrangement for transferring a load carrier comprising leading and trailing trolleys, particularly for power and free conveyors, from one drive means to another. The load carrier is carried by wheels movable on at least one track rail and is adapted to be coupled to a drive chain, which is guided by a drive rail and provided with coupling elements. The load carrier is provided with a main stop, which is movable into and out of the path of the coupling element, and with a locking pawl. Each coupling element is adapted to extend between the main stop and the locking pawl. Means are provided for disengaging the main stop from the coupling element.

In these known power and free conveyors, the main stop and the locking pawl either have the same height or the locking pawl is lower than the main stop. In the latter case, the trolleys carry an auxiliary stop, which is lower than the locking pawl. When the load carrier is to be transferred from one drive means to another, the coupling elements cooperate with the auxiliary stop to transfer the load carrier to a second drive rail because the spacing between the track rail and the drive rail is reduced. This arrangement eliminates the difficulties which may be caused by different speeds of travel encountered during a transfer of the load carrier from one track rail to the next, but the provision of numerous sections in which the distance between the track rail and the drive rail is reduced results in an unsteady operation of the several drive chains provided with the coupling elements. Besides, the known arrangements involve higher costs because specially made transfer rail sections are required and the distances to the second drive rail must be exactly determined when the design is made. When the spacing of the load carriers is subsequently changed, the constricted drive rail sections must be corrected. This correction involves an expensive alteration of the plant. Another disadvantage of known means for a transfer of the load carrier from one drive means to another resides in that the coupling element of the chain extending along the receiving drive rail moves at an angle to the direction of travel of the main stop when striking the same, because the known holding-down member does not hold down the main stop as far as to the end of the curved path and until the coupling element on the chain can correctly drive the main stop. That angle depends on the position of the coupling element. This angular impact results in an application of pressure in an oblique direction.

It is an object of the invention to provide for a transfer of a load carrier from one drive means to another an arrangement which is of the kind defined first hereinbefore and which avoids the above-mentioned disadvantages of the known arrangements. This object is accomplished according to the invention in that all track rails are spaced the same distance apart from the several drive rails throughout and a transfer of the load carrier along the track rail adjacent to a curved portion of the drive rail is enabled in that the main stop carried by the leading trolley of the load carrier is adapted to be disengaged from the coupling element on the drive chain by means of a lever provided with cams engageable with a camming bar, and the locking pawl is adapted to be disengaged from the coupling element carried by the drive chain by means of cams carried by the locking pawl and engageable with a camming bar, that a follow-up section is provided, in which a pusher connected to the trailing trolley of the load carrier and provided with cams is adapted to be moved by a camming bar into engagement with a coupling element carried by the drive chain and serving to transfer the load carrier to the receiving drive rail, and the main stop is moved into a straight portion of the path of the coupling elements of the receiving drive chain.

According to a feature of the invention, the camming bars provided to actuate the main stop, the locking pawl and the pusher are adapted to be applied to the track rail and have a length which is predetermined by the distance between the trolleys of the load carrier, and a track rail provided with a camming bar is connected by a switch to the track rail mentioned first.

According to a further feature of the invention, the camming bar provided on the underside of the carrier rail may be provided with a run-down ramp, which is pivoted on an axis.

According to further features of the invention, the load carriers may be arranged to be movable on wheels running on additional track rails, which are disposed above the first-mentioned track rails, and the additional track rail may be provided with detachable camming bars. The first-mentioned track rail may be provided with a continuous drive rail, which is connected to said first mentioned track rail, and the load carriers on said path of travel may be designed so as to be movable and transferrable to a track rail connected by switches and so as to be received by only one drive rail and/or to another track rail which is connected by a switch and from which the load carrier can be transferred by a drive chain to the first-mentioned track rail.

The invention will now be explained with reference to an embodiment which is shown diagrammatically and by way of example on the drawing, in which FIG. 1 is a top plan view showing the arrangement for a transfer of a load carrier from one drive means to another, and FIG. 2 is a side elevation showing the arrangement of FIG. 1 in a position in which the load carrier is transferred from a delivering drive rail to a receiving drive rail.

The arrangement shown in FIG. 1 comprises a track rail 3, which comprises two channel sections having their flanges directed toward each other. The track rail 3 extends from a delivering drive rail 4 to a receiving drive rail 5. The arrangement comprises another track rail 6, which is connected by a switch to the track rail 3 and which is associated with a curved portion of the drive rail 4, also a track rail 7, which can be connected to the track rail 3 by a switch and which is associated with the drive rail 5. The delivering drive rail 4 consists of an I beam, which moves running gears 8 provided with a coupling element 9 and connected to a chain 10, which is driven by a drive means 1. The receiving drive rail 5 has also the form of an I beam, which guides running gears 11 provided with a coupling element 12 and connected by a chain 13, which is driven by a drive means 2. The trolleys 14, 15 are connected by a beam 16 and move on the continuous track rail 3.

The load carrier comprises the leading trolley 14 and the trailing trolley 15, which are pivoted to and connected by the beam 16. The leading trolley 14 is provided with a known main stop 17, which acts in one direction and which has a bevelled forward surface portion so that the stop is movable below a coupling element 9 of the chain or another coupling element which has been moved close to the stop. A known actuating lever 18 carried by the leading trolley 14 can cooperate with a suitably designed run-up ramp 29 of the trailing trolley 15 of a preceding load carrier to disengage the main stop 17 from the coupling element 12 carried by the chain. Behind the main stop 17, the leading trolley 14 is provided with a locking pawl 20, which is pivoted on a pin 21 inserted into a bore of the trolley 14 and which has the same height as the main stop 17. The locking pawl 20 is provided with two cams 22 on opposite sides. The actuating lever 18 of the main stop 17 is also provided on its forward portion with two cams 19 disposed on opposite sides.

The trailing trolley 15 is provided with a pusher 23, which is pivoted on a dog 24 mounted in a bore of the trolley 15 and which has also two cams 25 on opposite sides. During normal travel, the pusher 23 is in an inoperative position, in which it is out of the path of the coupling element 9. In the region in which the load carrier is transferred from the drive rail 4, the pusher 23 is swung up to be engaged and moved by the coupling element 9.

Along the transfer section, the distance between the drive rail 4 and the drive rail 5, on the one hand, and the track rail 3, on the other hand, is constant and the rails are on the same level. A camming bar 26 is mounted on each flange or one flange of the channel sections forming the track rail 3 and extends from point C to the beginning of the curved track rail 6 at point A. The camming bar 26 has a length corresponding to the required transfer distance from point A to point B or from point C to point A. As a result, the pusher 23 of the trailing trolley 15 is swung up by the cams 25 to so that the coupling element 9 can engage and drive the pusher 23. When the transfer has been completed and the pusher has reached the point A, the pusher 23 returns to its inoperative position, in which it is out of the path of the coupling element 9. Adjacent to the receiving drive rail 5 at point B, a camming bar 27 is also mounted on each flange or one flange of the channel sections forming the track rail 3. Adjacent to the curved path of the coupling element 12 between points E and B, the camming bar 27 engages the cams 22 of the locking pawl 20 to swing the latter out of path of the coupling element 12. Only when the coupling element has entered the straight path behind point B does the camming bar 27 release the locking pawl 20 to return to its upright position.

In the area in which the load carrier is received by the drive rail 5 between points E and B, the lever 18 of the leading trolley 14 is raised so that its cams 19 engage the main stop 17 and move it out of the path of the coupling element of the receiving chain. The lever 18 is raised to disengage the main stop 17 from the coupling element 12 by a single camming bar carried by the track rail 3 or by two camming bars carried by the track rail on opposite sides. The length of the camming bar 28 will depend on the length of the portion of the drive rail 5 in which the main stop is to be lowered in between points E and B of the drive rail 5. When the coupling element 12 moves along a straight path behind point B, the lever 18 disengages the camming bar 28 so that the main stop returns to its position for engagement by the coupling element 12.

For a transfer from the track rail 7 to the drive rail 5, the camming bar 28 is pivoted at D so that the lever 18 of a load carrier which moves along the drive rail 5 from point E to point B is movable below the camming bar 28, whereby that portion 28a of the camming bar 28 which is rotatable about the point D is raised to a horizontal position and can subsequently drop when the lever 18 has left the camming bar. For a transfer from the track rail 7, a camming bar 30 is provided on the inner channel section of the track rail 7 and serves to raise the locking pawl 20 of the leading trolley 14 of a load carrier and the pusher 23 of the rear trolley 15 of the load carrier during the transfer to the carrier rail 3 so that the pawl and pusher engage the upper side of the camming bar 27 disposed on the track rail 3, and a satisfactory movement is ensured. The main stop 17 remains in engagement with the coupling member 12 and ensures a satisfactory continued movement.

The arrangement operates as follows: The drive unit 1 drives the chain in the drive rail 4 at a speed which is higher than the speed imparted by the drive unit 2 to the chain in the receiving drive rail 5. The leading trolley 14 is carried along the drive rail 4 to the point A by the coupling element 9 engaging the main stop 17. From point A, the coupling element 9 departs from the continuous track rail 3 and moves in the drive rail 4 along a horizontal arc. When the load carrier is in this position, the pusher 23 of the trailing trolley 15 is raised to position for engagement because its lateral cams 25 run up on the camming bar 26 and is pushed ahead by the next following coupling element 9 to the point A, behind which the pusher 23 leaves the camming bar 26 and the coupling element 9 laterally departs from the track rail 3 in the drive rail 4, as has been described hereinbefore. It is recalled that the trailing trolley is connected to the leading trolley by the beam 16. When the trailing trolley 15 has reached said position, the main stop 17 of the leading trolley 14 is disposed in the direction of travel behind point B in position for engagement by the coupling element 12 carried by the chain in the drive rail 5 and now moving along a straight path. This chain is driven by the drive unit 2 at a lower speed than the chain in the drive rail 4. In this position, the locking pawl 20 is still depressed by the camming bar 27 acting on the cams 22 so that the leading trolley 14 is not forced against the coupling element 12 of the chain in the receiving drive rail 5 because the load carrier 31 is coasting at a speed which is greater than that of the chain in the receiving drive rail 5 which may cause the locking pawl to prematurely move into its locking position thereby possibly resulting in damage to the conveyor due to the sudden stopping.

When the trailing trolley 15 pushes by means of the pusher 23 the leading trolley 14 forwardly so that its main stop 17 engages a coupling element 12 behind the point B of the drive rail 5, the leading trolley moves from point B at a higher speed, the main stop 17 due to its downwardly inclined surface 17a moves below the coupling element 12 and after overtaking the latter returns to its position M for engagement. By the cams 19 of the lever 18, the main stop 17 is kept out of the path of the coupling element 12 from point E to point B of the drive rail 5, so that just as the locking pawl 20 the stop 17 will not collide with the incoming coupling element 12. The driving engagement with the main stop 17 of the trolley 14 is not established until the point B has been passed. Behind said point, a satisfactory, straight engagement by the coupling element 12 can be established. The distance of the camming bars 26, 27 and 28 from the end points A and B, respectively, of the curved sections and the lengths of said camming bars will depend on the length of the load carrier 31 comprising the trolleys 14, 15, the length L of the transfer section between the points A and B and the radii $R_1$ and $R_2$ of the curved portions of the track rails and/or drive rails.

As is shown in FIG. 1, the drive rail 4 may depart from point A alone or together with a track rail 6 connected by a switch, and the drive rail 5 may approach the point B alone or together with the track rail 7 connected by a switch whereas only the track rail 3 extends from point A to point B. Along the two drive chains 10 and 13 used according to the invention, the distance between the track rail 3 and the drive rails is constant in the region where the transfer is effected. When load carriers are moved along the track rail 7 by means of the chain in the drive rail 5, the locking pawl 20 of the leading trolley 14 is swung down in the region from point E to point B of the track rail 7 by a camming bar 30 acting on the cams 22 so that the cam 22 can be satisfactorily transferred to the camming bar 27 of the track rail 3. As the trolley enters the track rail 3, the lever 18 of the leading trolley 14 moves below the camming bar 27 and the inclined run-down ramp 28a is raised about point D and is allowed to drop to its inoperative position when the trolley has passed. During this passage, the main stop 17 remains fully in engagement with the coupling element 12 to ensure a satisfactory coupling.

Any other transfer, which may be desired can be effected in an analogous manner. For instance, the track rail 3 may be connected to a continuous drive rail from O to P and the load carriers may be transferred only to a track rail 6 and received by a chain in a drive rail 40 and/or load carriers can be transferred from a track rail 7 by a chain system in a drive rail 41. The possibilities described hereinbefore in conjunction with correspondingly arranged camming bars, rail radii and length of the transfer section, as well as the selected distances between the leading and trailing trolleys of the load carrier and the design of the trolleys, ensure an absolutely reliable operation and are independent of the selected chain speeds and need not be synchronized.

What is claimed is:

1. In a conveyor, which comprises
track rail means including a transfer section, delivering and receiving drive rail means extending along said track rail means at opposite ends of said transfer section,
delivering and receiving drive chain means extending in and guided by said delivering and receiving drive rail means, respectively, and carrying coupling elements,
a load carrier comprising two trolleys spaced apart along and carried by said track rail means, and means connecting said two trolleys, and
a main stop carried by said leading trolley and movable into and out of the path of said coupling elements when said main stop is adjacent to said drive rail means,
said drive chain means being operable to move said load carrier along said track rail means in the direction from said delivering drive rail means to said receiving drive rail means so that one of said trolleys is a leading trolley and the other a trailing trolley,
transfer means for moving said load carrier from said delivering drive rail means along said transfer section to said receiving drive rail means, said transfer means comprising
a locking pawl carried by said leading trolley and spaced behind said main stop sufficiently to permit one of said coupling elements to extend between said locking pawl and said main stop in engagement with the latter, said locking pawl being movable into and out of the path of said coupling elements when said locking pawl is adjacent to said drive rail means,
a pusher connected to and succeeding said trailing trolley,
first camming means carried by said track rail means, said camming means being of predetermined length and positioned above said track rail upstream of said transfer section, said camming means being arranged to move said pusher into the path of said coupling elements of said delivering drive chain means before said main stop enters said transfer section so that said pusher is engageable by a coupling element of said delivery drive chain means,
said pusher being sufficiently spaced behind said main stop to permit said load carrier to be moved by said delivering drive chain means with one of its coupling elements in engagement with said pusher until said main stop is beyond said transfer section, a lever carried by said leading trolley and operable to move said main stop out of the path of said coupling elements when said main stop is adjacent to one of said drive rail means, and
second camming means carried by said track rail means, said camming means being of predetermined length and positioned below said track rail at a distance ahead of said first camming means, said second camming means having at least the leading end portion thereof extending into said transfer section and being arranged to engage said lever and said pawl before said main stop enters said transfer section and then to move said pawl and by means of said lever to move said main stop out of said path of said coupling elements of said delivering drive chain means, and to keep said pawl and by means of said lever to keep said main stop out of the path of said coupling elements of said receiving drive chain means until said main stop has moved beyond said transfer section.

2. A conveyor as set forth in claim 1, which constitutes a power and free conveyor.

3. A conveyor as set forth in claim 1, in which said track rail means comprise a plurality of track rails.

4. A conveyor as set forth in claim 1, in which said track rail means comprise a straight delivery section at one end of said transfer section and longitudinally aligned therewith, and a straight receiving section at the other end of said transfer section and longitudinally aligned therewith, said delivering drive rail means comprise a straight delivering portion adjacent to and parallel to and uniformly transversely spaced from said delivery section of said track rail means, and a curved portion departing from said track rail means adjacent to said transfer section, said receiving drive rail means comprise a straight receiving portion adjacent to and parallel to and uniformly transversely spaced from said receiving section of said track rail means, and a curved portion approaching said track rail means adjacent to said transfer section, said first camming means are arranged to provide for an engagement of said pusher by a coupling element of said delivering drive chain means before said main stop has left said delivery section and until said main stop has entered said receiving section, and said second camming means are arranged to keep said locking pawl and by means of said lever to keep said main stop out of the path of said coupling elements of said drive chain means along said curved portions.

5. A conveyor as set forth in claim 1, in which
said pusher carries cams engageable with said first camming means and
said lever and pawl carry cams engageable with said second camming means.

6. A conveyor as set forth in claim 1, in which the length of said second camming means is coordinated with the spacing between said first and second trolleys.

7. A conveyor as set forth in claim 1, in which said transfer section is curved.

8. A conveyor as set forth in claim 1, in which
said track rail means comprise a straight first delivery section, a straight receiving section longitudinally aligned with said first delivery section, and a straight second delivery section extending at an angle to said first delivery section and receiving section, said transfer section comprises a switch including a straight branch connecting said first delivery section and said receiving section, and a curved branch connecting said second delivery section and said receiving section, said delivering drive rail means comprise first and second delivering drive rails extending along said first and second delivery sections, respectively, said delivering drive chain means comprise first and second delivering drive chains extending in and guided by said first and second delivering drive rails respectively, said first camming means comprise camming means arranged to move said pusher into the path of said coupling elements of said first delivering drive chain before said main stop enters said transfer section from said first delivery section so that said pusher is engageable by a coupling element of said first delivering drive chain, and camming means arranged to move said pusher into the path of said coupling of said second delivering drive chain before said main stop enters said transfer section from said second delivery section so that said pusher is engageable by a coupling element of said second delivering drive chain, and said second camming means comprise camming means arranged to move said main stop and pawl out of the path of the coupling elements of said first delivering drive chain before said main stop enters said transfer section from said first delivery section, and camming means arranged to move said main stop and pawl out of the path of the coupling elements of said second delivering drive chain before said main stop enters said transfer section from said second delivery section.

9. A conveyor as set forth in claim 1, in which
said track rail means comprise a straight delivery section, a straight first receiving section longitudinally aligned with said delivery section, and a straight second receiving section extending at an angle to said delivery section and first receiving section, said transfer section comprises a switch including a straight branch connecting said delivery section and said first receiving section, and a curved branch connecting said delivery section and said second receiving section, said receiving drive rail means comprise first and second receiving drive rails extending along said first and second receiving sections, respectively, said receiving drive chain means comprise first and second receiving drive chains extending in and guided by said first and second receiving drive rails, respectively, and said second camming means are arranged to keep said pawl and said lever out of the path of said coupling elements of said first and second receiving drive chains until said main stop has moved beyond said transfer section.

10. A conveyor as set forth in claim 1, in which
said second camming means comprise a camming bar disposed on the underside of said track rail means and a run-down ramp adapted to release said lever and pawl when said main stop has moved beyond said transfer section, said run-down ramp being pivoted to said camming bar on a horizontal axis extending transversely to said bar.

11. A conveyor as set forth in claim 1, in which
said track rail means comprise a straight first delivery section, a straight receiving section longitudinally aligned with said first delivery section, and a straight delivery section extending at an angle to said first delivery section and receiving section, said transfer section comprises a switch including a straight branch connecting said first delivery section and said receiving section, and a curved branch connecting said second delivery section and said receiving section, said delivering drive rail means comprise first and second delivering drive rails extending along said first and second delivering sections, respectively, said first delivering drive rail and said receiving drive rail means are formed by a single drive rail extending along said straight branch, said delivering drive chain means comprise first and second delivering drive chains extending in and guided by said first and second delivering drive rails, respectively, said first delivering chain and said receiving chain means are formed by a single chain extending along said straight branch, said first camming means are arranged to move said pusher into the path of said coupling elements of said second delivering drive chain before said main stop enters said transfer section from said second delivery section so that said pusher is engageable by a coupling element of said second delivering drive chain, and said second camming means are arranged to move said main stop and said pawl out of the path of said coupling elements of said second delivering drive chain before said main stop enters said transfer section from said second delivery section.

12. A conveyor as set forth in claim 1, in which said track rail means comprise a straight delivery section, a straight first receiving section longitudinally aligned with said delivery section, and a straight second receiving section extending at an angle to said delivery section and first receiving section, said transfer section comprises a switch including a straight branch connecting said delivery section and said first receiving section and a curved branch connecting said delivery section and said second receiving section, said receiving drive rail means comprise first and second receiving drive rails extending along said first and second receiving sections, respectively, said delivering drive rail means and said first receiving drive rail are formed by a single guide rail extending along said straight branch, said receiving drive chain means comprise first and second receiving drive chains extending in and guided by said first and second receiving drive rails, respectively, said delivering chain means and said first receiving chain are formed by a single chain extending along said straight branch, and said second camming means are arranged to keep said pawl and said main stop out of the path of said coupling elements of said second receiving drive chain until said main stop has moved onto said second receiving section.

13. A conveyor as set forth in claim 1, said first and second camming means each being, respectively, an elongate camming bar.

14. A conveyor as set forth in claim 1, said delivering drive claim means adapted to be conveyed at a velocity greater than the velocity of said receiving drive chain means.

15. A conveyor as set forth in claim 1, said first and second camming means being releasably fastened to said track rail means.

16. A conveyor as set forth in claim 1, said second camming means having an end portion adapted to be pivoted about a substantially horizontal axis.

* * * * *